United States Patent [19]
Heins et al.

[11] Patent Number: 5,528,660
[45] Date of Patent: Jun. 18, 1996

[54] DISPLAY-BASED CONTROL MECHANISM RESIDENT IN PORTABLE TEST AND COMMUNICATIONS DEVICE FOR FACILITATING CRAFTSPERSON'S REMOTE TESTING OF SELECTED PORTION OF TELEPHONE NETWORK

[75] Inventors: Dana E. Heins, Moorpark; Onofrio Schillaci, Camarillo, both of Calif.

[73] Assignee: Harris Corp., Melbourne, Fla.

[21] Appl. No.: 339,904

[22] Filed: Nov. 14, 1994

Related U.S. Application Data

[63] Continuation-in-part of Ser. No. 235,317, Apr. 29, 1994.
[51] Int. Cl.$^6$ ............................. H04M 1/24; H04M 11/00
[52] U.S. Cl. .............................. 379/21; 379/27; 379/58; 379/59
[58] Field of Search ..................... 379/1, 21, 27, 379/29, 33, 32, 58, 59, 61; 455/37.1, 33.2, 67.1, 86

[56] References Cited

U.S. PATENT DOCUMENTS

| | | | |
|---|---|---|---|
| 4,841,560 | 6/1989 | Chan et al. | 379/29 |
| 4,912,755 | 3/1990 | Blood et al. | 379/21 X |
| 4,922,516 | 5/1990 | Butler et al. | 379/21 |

OTHER PUBLICATIONS

IEEE Vehiculer Technology Conference, Dallas TX, Mar. 1978 Huff et al., "The Chicago Developmental Cellular System".

*Primary Examiner*—Stephen Chin
*Assistant Examiner*—Paul Loomis
*Attorney, Agent, or Firm*—Charles E. Wands

[57] ABSTRACT

A portable, digital processor-based system equips a craftsperson with the ability to test a subscriber line of a telephone network by accessing a direct test unit (DATU) of a telephone office, said DATU being configured to respond to commands from a telephone test set and to generate audio messages that provide the user with information relating to control of the operation of the test unit for testing a subscriber line, said portable, digital processor-based system having an input/output device, including a visual display, through which information input by the user is converted into tone signals and transmitted to said DATU, and through which information associated with the operation of said DATU is presented by said test device to the user. The displayed information is interactively updated in response to one or more inputs supplied via the input/output device by the user, irrespective of the generation of audio messages by the DATU.

25 Claims, 4 Drawing Sheets

DISPLAY-BASED CONTROL MECHANISM RESIDENT IN PORTABLE TEST AND COMMUNICATIONS DEVICE FOR FACILITATING CRAFTSPERSON'S REMOTE TESTING OF SELECTED PORTION OF TELEPHONE NETWORK

CROSS-REFERENCE TO RELATED APPLICATIONS

The present application is a continuation-in-part of co-pending application Serial No. 235,317 (hereinafter referenced as the '317 application), filed Apr. 29, 1994, entitled: "Telecommunication Test System Including a Test and Trouble Shooting Expert System," by K. R. Selig et al, assigned to the assignee of the present application, and the disclosure of which is herein incorporated.

FIELD OF THE INVENTION

The present invention relates in general to telephone communication systems and networks, and is particularly directed to a new and improved display-based control mechanism that is resident in a portable test/communications device for facilitating a craftsperson's remote testing of a selected portion of a telephone network.

BACKGROUND OF THE INVENTION

The above-referenced co-pending '317 application describes a new and improved portable telecommunications test system generally configured as diagrammatically illustrated in FIG. 1. As shown therein, such portable test system is comprised of a hand-held personal computer unit 10, through which a craftsperson, who has been dispatched to a service site that is remotely located with respect to a central office 12 serving a line to be tested (or line under test (LUT)) 16, may communicate with central office 12 and with a generic test head 14 that is connectable to the LUT 16. Hand-held personal computer unit 10 may comprise a Newton™ computer available from Apple Computer Corporation.

The test system functionality of the software contained within the craftsperson's hand-held computer unit 10 is operative to provide the service technician with a user-friendly, step by step test procedure that is designed to facilitate the craftsperson's ability to perform various tests on a selected line. In so doing, the craftsperson's portable computer is able to interact with multiple types of existing operational support systems, as well as provide a platform for add-on information exchanges. Via a contact-sensitive (pen touch-operated) video display panel 15, and an associated keyboard 17 of hand-held computer unit 10, the craftsperson is able to selectively invoke one or more test operations represented by a set of analysis and test function-associated icons. In response to these selections, the internal processor of unit 10 executes communication and signal processing operations associated with an identified test.

The test head 14 performs all data acquisition on demand from the personal computer unit 10, including functional tests. Test head 14 and hand-held personal computer unit 10 can be expanded through plug-in cards and software programs for coupling with various diverse types of communication links. The plug-in cards of the test head 14 may comprise a number of cards for coupling with various lines to be tested, such as, but not limited to, an analog telephone circuit card, an analog PL/SS card, a digital card for coupling with high speed digital transmission circuits, a fiber optic card for coupling with a fiber optic line, an integrated services digital network (ISDN) "U" interface card for coupling with an ISDN line, a community access television (CATV) card for coupling with a CATV transmission link; and an optical loop carrier/digital loop carrier card. Alternatively, the functionality of such plug-in cards may be implemented in communication application software that is executed by hand-held computer unit 10 or by a processor in the test head proper.

In order to communicate with (remote) central office 12 or with a data center 18 associated with the central office 12, the craftsperson's computer unit 10 contains a transceiver interface that enables it communicate with a communication and signal processing subsystem on board a technician's service vehicle or van 20. This transceiver interface is such as to enable communications between personal computer unit 10 and service vehicle 20 to be provided either by either a short haul wireless link, or an auxiliary back-up wireline. Such a transceiver interface may be implemented in the manner described in co-pending application Ser. No.08/338,916, filed coincident herewith, by O. Schillaci et al, entitled: "Wireless—Wireline Communications Selection Mechanism Resident in Craftsperson's Portable Test and Communications Device," assigned to the assignee of the present application and the disclosure of which is herein incorporated.

The service van's communication and signal processing subsystem, shown at 22, includes a battery holder/charging station 24, a printer 26, a long haul wireless interface 28 and a network server 29. Battery holder/charging station 24 is configured to receive and store the portable hand-held computer unit 10, so that the computer unit 10 may be secured stowed and its associated power supply (battery pack) may be recharged, when not in use. Printer 26 is available to print out various test results or other information. Long haul wireless interface 28 provides a wireless gateway to long haul wireless services, while network server 29 contains a file server that provides additional processing power and electronic data storage. Network server 29 is operative to perform auxiliary data processing tasks on demand from the computer unit 10.

Central office 12 typically includes a central office switch 31, central office test devices 33, and a line-conditioning device 35, such as a direct access test unit (DATU). The central office test devices 33 are capable of providing an interface with various operational support systems of the data center 18, such as a service vehicle dispatch, outside plant record database, automated testing systems, and electronic network schematics. The line-conditioning device (DATU) 35 within central office 12 provides the craftsperson with the ability to selectively conduct a number of tests of a line, by invoking specified key combinations (sequences) from a standard craftsperson's telephone test set.

In the course of conducting a test via test head 14, hand-held personal computer 10 receives the raw measured data from the test head and operates on the received data to convert the measurement results into usable parameter information. This usable parameter information is then linked (via a wireless or wireline link employed by the computer unit's transceiver interface) to the service vehicle's communication subsystem 22, so that it may be forwarded to a line conditioning device or automated test equipment in central office 12.

Although not shown in FIG. 1, the craftsperson may also be provided with an auxiliary voice-activated, wireless headset for conducting wireless voice communications with hand-held computer unit 10. Such a wireless headset can be used with the hand-held computer 10 and the test head 14 to run automated tests, with an audio go/no-go indication of the test results being provided to the craftsperson.

In a non-limiting example of responding to a customer service request, the portable telecommunications test system of FIG. 1 operates as follows. A craftsperson who has been dispatched to a test site (using service vehicle 20) proceeds to physically couple the test head 14 to the line under test. Using computer unit 10, the technician then establishes communications with the test head 14 and, via the communication subsystem 22 in van 20, with the central office, so that one or more tests may be placed on the line.

Using the computer's (contact-sensitive) display panel 15, once the technician has coupled the test head 14 to the line under test, the test application software resident in hand-held computer unit 10 is operative to display icons associated with respective test procedures for evaluating the LUT. In response to the service technician selecting a desired test function, the resident test software of computer unit 10 proceeds to interactively generate additional menus through which the craftsperson specifies further choices for defining parameters required for implementing the selected test. Based upon the choices selected by the craftsperson, computer unit 10 assembles and transmits a message to the test head and to the central office for establishing what test or tests are to be conducted and the parameters associated with those tests. The test head 14 measures the response of the line to various conditions placed on the line, and transmits the test response data back to computer unit 10. As pointed out above, computer unit 10 takes the raw data transmitted from the test head 14 and processes the data in accordance with an on-board test or line analysis program. Based upon the results of the processed information, the craftsperson may direct the test device to perform one or more additional tests, until the line has been completely tested.

Now although the mobility-enhancing system of the test system described in the '317 application is operative to by facilitate the craftsperson's access to and testing of a designated line, and thereby expedite the servicing of a customer request, it is intended to do so without requiring a replacement of the existing (central office) equipment employed by the telephone service provider. As a consequence, the manner in which the mobile test access system described in the '317 application communicates with and responds to information generated by remote (central office) equipment must be compatible with that equipment's signalling and data formats.

For example, in the case of performing line-conditioning tests, the direct access test unit 35 within central office 12 may be of the type described in the U.S. patent to A. Chan et al, No. 4,841,560 (the '560 patent), entitled: "Direct Access Test Unit for Central Office," issued Jun., 20, 1989, and the disclosure of which is herein incorporated. Such a DATU is operative to respond to the craftsperson selectively keying a specified audio tone combination from a telephone test handset, and to synthesize voice instructions to the craftsperson. Thus, for such an installation, whatever test/ communication interplay is conducted between the portable computer 10 and central office 12 must be compatible with and operationally invisible to the tone and voice sequences used by the DATU.

SUMMARY OF THE INVENTION

In accordance with the present invention, the display-based test control mechanism employed by the above-referenced craftsperson's portable test/communications computer unit for controlling a test device at a telephone service provider's remote facility (central office) is configured so as to enable the functionality of the remote test device to be expeditiously executed without requiring modification of the control software employed by the test device. In addition, it allows a technician of only limited training or experience to competently exercise the test system in the central office in order to successfully test the line.

For this purpose, in addition to presenting a set of test device-associated icons, through which the craftsperson invokes test functions and specifies parameters used in such test functions, as described in the '317 application, the present invention is operative to translate the choices made by the craftsperson into DTMF tone-based instruction signals expected to be seen by the remote test device, so that it appears to the test device that the craftsperson is operating a telephone test set of the type with which the test device was designed to operate. As such, the test device will operate without modification, transmitting transmit audio signals (audio tones and synthesized voice instructions) as directives to the craftsperson, and will respond to tone signals that have been generated by the craftsperson's portable computer unit in accordance with a translation of the craftsperson's invoking selected icons from the portable computer unit's display menu.

In accordance with the flow sequence of the interactive control mechanism of a first embodiment of the present invention, when the craftsperson selects the DATU function from a menu containing a set of test device-associated icons, the contents of the display screen are changed to request the craftsperson to supply the DATU access number of the test unit, which is transmitted from the portable computer unit to the central office DATU. When initially accessed, the DATU generates a primary (440 Hz) dial tone signal, in response to which the portable computer display prompts the craftsperson to enter a user security code, in order to gain access to the testing features of the DATU, as well as the subscriber number of the line to be tested.

The craftsperson must enter a number via the computer unit's keypad within a given time-out interval. If the craftsperson takes no action within the time-out interval, an error message is displayed, as the DATU's control processor releases the line. Once these numbers are entered by the craftsperson, they are transmitted to the DATU. If the subscriber number is incorrect, the DATU will report this error audibly; the control mechanism of the present invention does not detect this type of error. If the correct access code is incorrect, the DATU simply disconnects (without generating an error message). Again, the control mechanism does not detect this type of error. If the security code and subscriber line number are correct, secondary dial tone is generated by the DATU's processor. This secondary dial tone, in addition to be supplied via the computer unit's modem into an on-board speaker, is also decoded into a displayed DATU test menu, through which the craftsperson is advised that he has been given access to the test unit, and may proceed to test the line.

Using the displayed menu, the craftsperson selects a test to be performed with respect to the subscriber line circuit. The control mechanism within the DATU is configured to require the craftsperson to select a given test within a prescribed period of time (e.g. seven seconds) after being authorized to begin selection. Because of the operation of the DATU, if no selection is made within this time-out interval, the DATU's control processor will generate a series of voice messages listing different test functions that may be performed by dialing various digits, as described above. Although the craftsperson may listen to this voiced list, and then enter the required keystrokes after hearing the list, the displayed list allows the craftsperson to see all of the options simultaneously as a continuous presentation of the choices. Such a video display relieves the craftsperson from having to remember the list, and having to wait until the keycode of a given function is voiced. Once the testing of the subscriber line has been completed, an EXIT prompt is displayed. If the test routine is terminated, the routine returns to the wait state.

In accordance with a second embodiment of the present invention, rather than requiring the craftsperson to enter the DATU access number and the subscriber line number, the information contained in the trouble ticket is employed to automatically display the DATU access number and subscriber line number, thereby expediting the craftsperson's access to the test unit.

DETAILED DESCRIPTION

Figure 1:
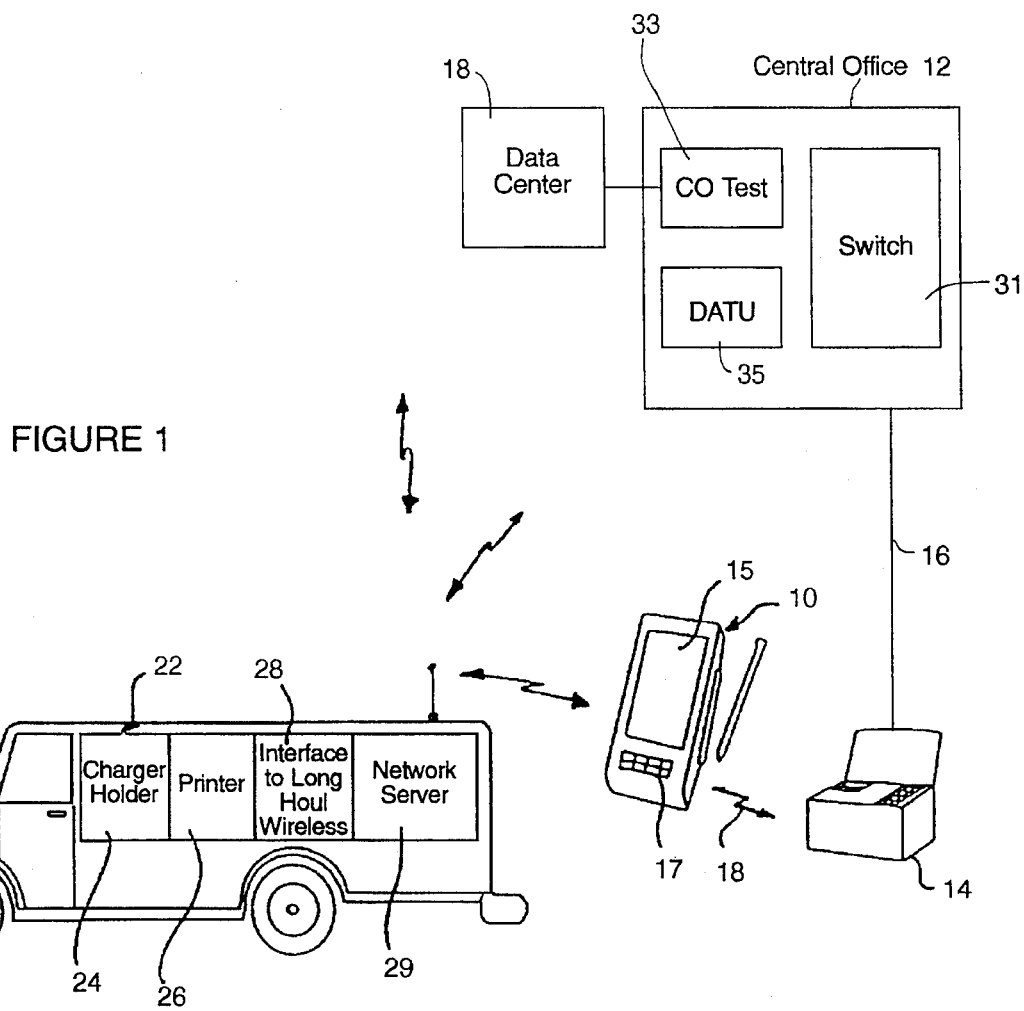
FIG. 1 diagrammatically illustrates a portable telecommunications test system as described in the above-referenced co-pending '317 application.

Before describing in detail the new and improved display-based test control mechanism in accordance with the present invention, it should be observed that the present invention resides primarily in what is effectively a prescribed communications exchange control mechanism that is embedded in the communications control software resident in the craftsperson's portable computer unit, for enabling the craftsperson to interactively automate execution of the test routine executed by a remote test device (DATU) in the central office. The particular tests carried out by the remote test device are unaffected by this communications exchange control mechanism and, per se, are not considered part of the invention.

Consequently, the manner in which the present invention communicates with and interactively controls the operation of such a DATU device have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As pointed out briefly above, a significant feature of the present invention is that fact that it not only enables the functionality of the remote test device (DATU) to be executed as intended, without modification of the control software employed by the test device, but does so in a manner that permits a lesser skilled craftsperson to operate the test system. In order to accomplish this objective, the present invention is operative to translate a craftsperson's selection of an icon presented on the computer unit's display into DTMF tone-based instruction signals expected to be seen by the remote test device, so that it appears to the test device that the craftsperson is operating a conventional telephone test set. As a consequence, the DATU itself operates without modification, transmitting transmit audio signals (audio tones and synthesized voice instructions) as directives to the craftsperson. To facilitate an understanding of the interactive control mechanism of the present invention, it is useful to examine the manner in which the direct access test unit described in the '560 patent interfaces with a craftsperson's telephone test set, in order to test a subscriber line.

Figure 2:
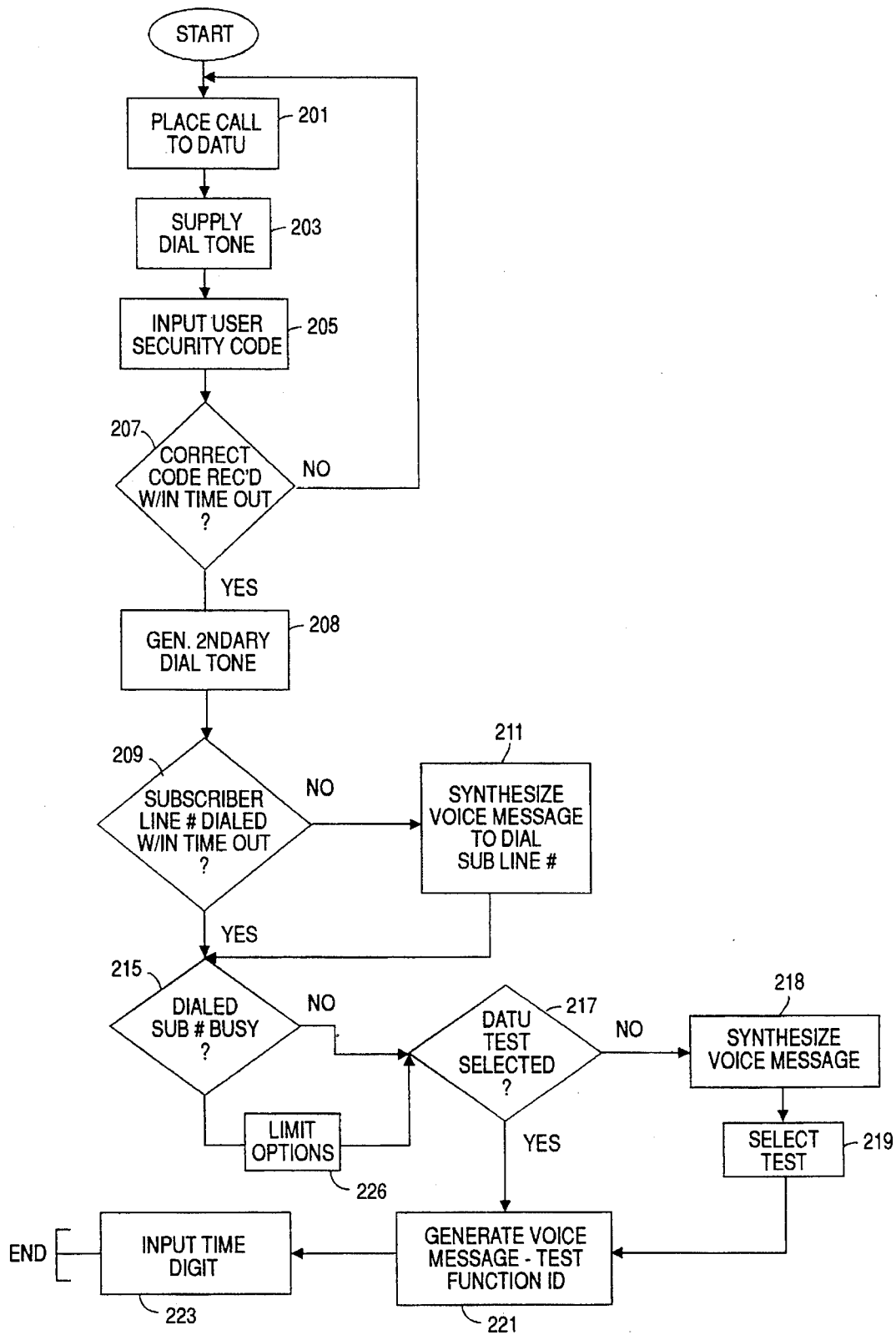
FIG. 2 shows the operational flow sequence of a DATU described in the above-referenced '560 patent.

More particularly, referring to FIG. 2, which shows the operational flow sequence of the DATU, in step 201, a craftsperson places a call to the DATU for the purpose of conducting a test of a line. In step 203, the DATU's control processor supplies a 440 Hz dial tone to the craftsperson's telephone test set. Upon receiving dial tone, then in step 205, the craftsperson must dial a user security code in order to gain access to the testing features of the DATU. This user security code, which is stored in a table in the DATU's memory, should be known to the craftsperson if the craftsperson is authorized to access and utilize the DATU. (As described in the '560 patent, the control processor within the DATU is operative to perform a number of housekeeping tasks, such as maintaining an account of various accesses to the DATU, storing data related to subscriber lines to be accessed, storing required security codes, and maintaining a list of the identification of prefixes to be used for various tests capable of being initiated by the DATU.)

In step 207, the DATU looks to see if the correct security code is dialed within a given time-out interval. If the craftsperson takes no action at all within the timeout interval, which will cause the answer to step 207 to be NO, the DATU's control processor will automatically release the line. If a code is dialed within the time-out interval, but it is not the correct security code is not dialed, the answer to step 207 will again be NO, so that a secondary dial tone that is expected to be heard by the craftsperson will not be generated, whereby the craftsperson will know that he has either made an error in dialing the access/security code or does not know the correct code.

If the correct security code is dialed (the answer to step 207 is YES), secondary dial tone is generated by the DATU's processor in step 208, informing the craftsperson that he has been given access to the test unit, and may proceed to test a line.

Assuming that the answer to step 207 is YES (the craftsperson has dialed the proper user access code and has received dial tone), then, in step 209, he must proceed, within a specified time-out interval (e.g. 10 seconds), to begin dialing the number of the subscriber line circuit upon which a test is to be conducted. If the craftsperson takes no action within the time out interval (the answer to step 209 is NO), then in step 211, the control processor within the DATU will proceed to generate a synthesized voice message, informing the craftsperson that a seven digit subscriber line number should now be dialed. If the craftsperson is skilled and therefore familiar with the operating procedure for operating the test unit, he will know that it is unnecessary to wait for this voice message to be completed; the craftsperson can immediately begin dialing the seven digit number of the subscriber line circuit to be tested, once he has heard the secondary dial tone. In this case, when the craftsperson begins dialing the number of the subscriber line (YES at step 209), such action will override the control processor's further generation of such a voice message in step 211, so that the synthesized voice message will not be generated.

If the dialed subscriber line is busy (the answer to step 215 is YES), the DATU limits the number of test options in step 216 and proceeds to step 217. If the dialed subscriber line is not busy (the answer to step 215 is NO), the DATU will generate a voice message, such as "OK," advising the craftsperson that the designated subscriber line is idle and has been accessed for testing.

Next, in step 217, the craftsperson proceeds to dial a prescribed digit selecting a test to be performed with respect to the subscriber line circuit and, if skilled, he may do so immediately, being familiar with the test unit and its operation. If no digit is dialed by the craftsperson within a prescribed period of time (e.g. seven seconds) after generation of the "OK" voice message, so that the answer to step 217 is NO, then, similar to step 211, the DATU control processor will supply, in step 218, a series of voice messages listing different test functions that may be performed by dialing various digits.

After listening to the menu voiced in step 218, the craftsperson may select one of the test functions to be initiated and dial the appropriate digit in step 219. Each time a test function is initiated in response to a digit dialed by the craftsperson in either of steps 217 or 219, the DATU's control processor will supply a voice message in step 221, identifying a test function, such as "audio monitor", "high level tone", "low level tone", "open line" and "short line". (When selecting the "hold test" utility function, a further voice message "dial number of minutes" will be supplied to the craftsperson in step 221), in response to which the craftsperson is expected to dial an additional (single) digit in step 223, which specifies the number of minutes the test currently in progress is to remain in effect after disconnect. Although the DATU will normally disconnect immediately when the subscriber goes on hook, it has the capability of continuing a test function for a relatively prolonged period of time (e.g. from one to ten minutes) after going on hook, if so instructed.

Figure 3:
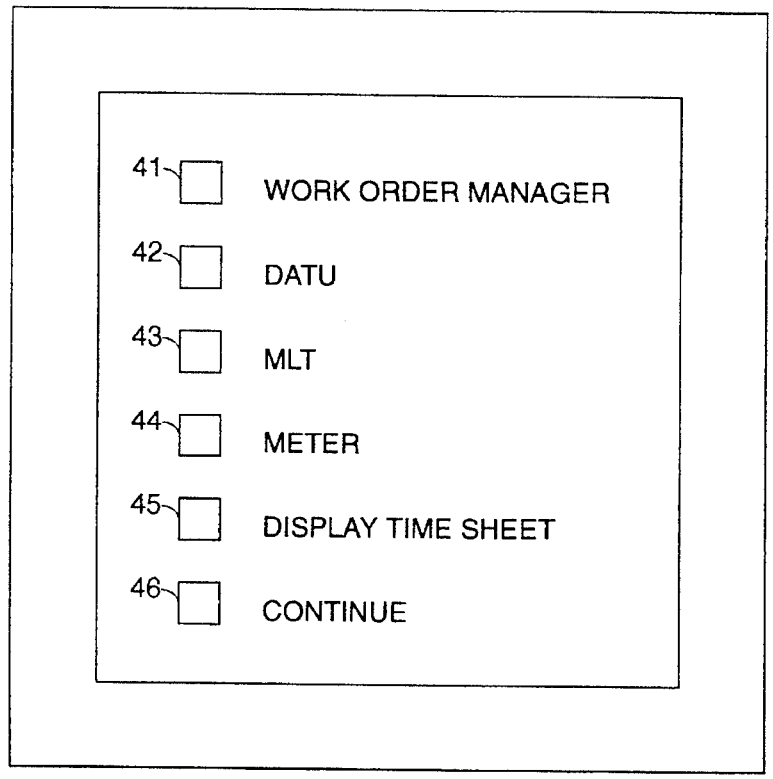
FIG. 3 shows a display menu through which craftsperson is queried to select one of a plurality of listed function icons.

In accordance with the invention described in the above-referenced '317 application, once the craftsperson has coupled the test head to the line under test and has begun the test routine resident within portable computer unit 10, the icon display control mechanism will present a menu of the type depicted in FIG. 3, through which craftsperson is queried to select one of a plurality of listed functions such as a work order manager 41, DATU 42, MLT 43, meter 44, display time sheet 45, and a configuration function 46.

As described briefly above, in accordance with the present invention, when the craftsperson selects the DATU function icon 42, that selection is translated into a sequence of interactive operations that effectively associates the sequence of steps set forth in FIG. 2, described above, with messages that are visually presented to the craftsperson and retained on the computer unit's display screen for a prescribed period of time until invoked by the craftsperson. In this manner the craftsperson need not be as proficiently skilled as would be necessary to properly respond to voiced messages from the DATU. Moreover, in addition to providing a visual, parallel presentation of such instruction messages, the display control mechanism of the present invention is operative to reduce the amount of preliminary information customarily supplied by the craftsperson, such as the DATU access code and the subscriber line number. The control mechanism within the DATU itself is not altered, so that the DATU is still operative to transmit audio signals (audio tones and synthesized voice instructions) as directives to the craftsperson.

Figure 4:
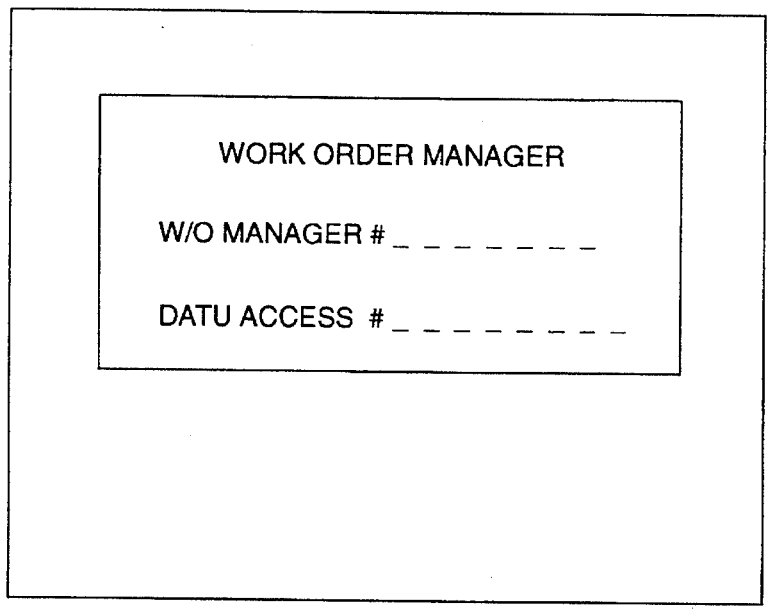
FIG. 4 shows a display screen that is employed when the DATU icon of FIG. 3 is selected.
Figure 5:
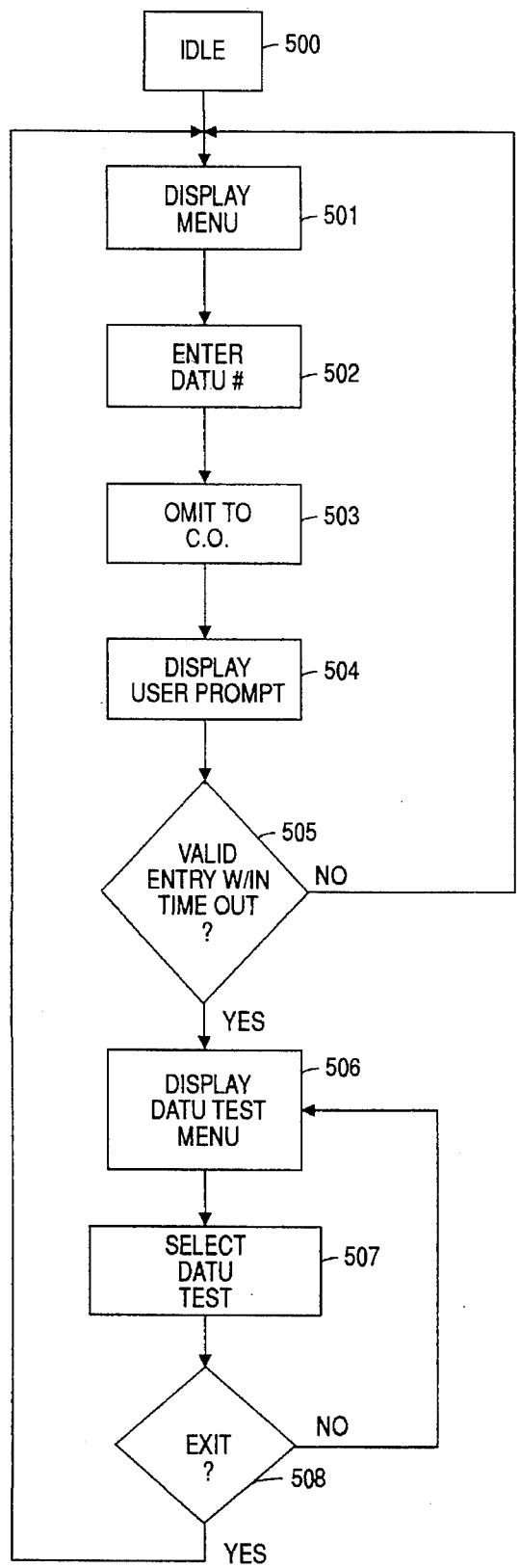
FIG. 5 shows the operational flow sequence of the interactive control mechanism of an embodiment of the present invention for controlling the operation of a remote test device.

Referring to FIG. 5, the operational flow sequence of the interactive control mechanism of a first embodiment of the present invention for controlling the operation of a remote test device (in particular, the above-described DATU) is initially in an idle or wait state 500, until the DATU icon depicted in the menu of FIG. 3 is invoked by the craftsperson. When the DATU function is selected, the process proceeds to step 501, wherein it brings up the display screen shown in FIG. 4. In this step, the craftsperson is requested to supply specified user inputs, in particular the DATU access number of the test unit. In step 502, the craftsperson uses the computer keyboard must enter the DATU number, which is then transmitted to the central office DATU in step 503.

As explained previously, when initially accessed, the DATU's control processor is operative to generate a primary 440 Hz dial tone. In response to this tone, step 504 generates a display that prompts the craftsperson to enter a user security code or password, in order to gain access to the testing features of the DATU, as well as the subscriber number of the line to be tested. In step 505, a soft-timer determines whether the craftsperson has begun entering a number via the computer unit's keypad within a given time-out interval (e.g. seven seconds). If the craftsperson takes no action at all within the time-out interval, which will cause the answer to step 505 to be NO, an error message is displayed to the craftsperson, and the routine returns to step 501, as the DATU's control processor automatically releases the line. Conversely, if the craftsperson has begun entering a security code and line number within the time-out interval, but the entered data is invalid, the answer to step 505 will again be NO, and no error message will be displayed. Once these numbers are entered by the craftsperson, they are transmitted to the DATU.

If the security code and subscriber line number entered by the craftsperson and transmitted to the DATU are correct, secondary dial tone is generated by the DATU's processor. This secondary dial tone, in addition to be supplied via the computer unit's modem into an on-board speaker, is also decoded by the control mechanism in computer 10 into a displayed DATU test menu (step 506), through which the craftsperson is advised that he has been given access to the test unit, and may proceed to test the line.

Using the menu displayed in step 506, in step 507 the craftsperson proceeds to select a test to be performed with respect to the subscriber line circuit. As described above with reference to FIG. 2, the control mechanism within the DATU is configured to require the craftsperson to select a given test within a prescribed period of time (e.g. seven seconds) after being authorized to begin selection (corresponding to a voiced "OK" message being sourced from the DATU). Because of the operation of the DATU, if no selection is made within this time-out interval, the DATU's control processor will generate a series of voice messages listing different test functions that may be performed by dialing various digits, as described above. Although the craftsperson may listen to this voiced list, and then enter the required keystrokes after hearing the list, the displayed list allows the craftsperson to see all of the options simultaneously as a continuous presentation of the choices. Such a video display relieves the craftsperson from having to remember the list, and having to wait until the keycode of a given function is voiced.

In connection with the previously described list of test functions of the test menu voiced in step 218 of FIG. 2, the displayed "hold test" utility function displayed in step 506 is also accompanied by further icon "dial number of minutes" in response to which the craftsperson enters an additional value specifying the number of minutes the test currently in progress is to remain in effect after disconnect.

Once the testing of the subscriber line has been completed, an EXIT prompt is displayed, as shown at step 508. If the answer to step 508 is NO, the routine transitions to step 507, for another selection of one of the tests displayed in step 506. If the test routine is terminated (the answer to EXIT step 508 is YES), the routine returns to step 501.

In accordance with a second embodiment of the present invention, rather than requiring the craftsperson to enter the DATU access number and the subscriber line number, the information contained in the trouble ticket is employed to automatically display the DATU access number and subscriber line number, thereby expediting the craftsperson's access to the test unit. In this embodiment, step 502 is by-passed to step 504, so that the routine generates a display that immediately prompts the craftsperson to enter a user security code or password, in order to gain access to the testing features of the DATU, as well as the subscriber number of the line to be tested.

As will be appreciated from the foregoing description, pursuant to the present invention, the display-based test control mechanism employed by the craftsperson's portable test/communications computer unit employed in the system described in the '317 is configured to both enable the functionality of the remote test device to be expeditiously executed without requiring modification of the control software employed by the test device, and to allow a technician of only limited training or experience to competently exercise the test system in the central office in order to successfully test the line.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of testing a subscriber line of a telephone network by means of a test unit of a telephone office, said test unit being operative to respond to commands from a telephone test set and to supply a sequence of audio messages to said telephone test set for providing a user with information for controlling the operation of said test unit, said method comprising the steps of:

(a) providing a telecommunications test system through which a user, who may be dispatched to a service site that is remotely located with respect to said telephone office serving said subscriber line, may communicate with said test unit of said telephone office and with a test head that is connectable to said subscriber line, said test system having an input/output device, including a visual display, through which information input by said user is converted into prescribed control signals and transmitted to said test unit and through which information associated with the operation of said test unit is presented to said user; and (b) causing said visual display to effect a simultaneous display of information contained in said sequence of audio messages supplied by said test unit to said telecommunications test system, through which a user may cause said test system to conduct a test of said subscriber line, coincidentally with the supplying of said sequence of audio messages to said test system by said test unit to said telecommunications test system and to interactively update said displayed information in response to one or more inputs interactively supplied via said input/output device by said user.

2. A method according to claim 1, wherein step (b) comprises causing said visual display to display a request for information through which a user may cause said test system to conduct a test of said subscriber line, and in response to a lack of said information being input to said test system within a prescribed period of time, terminating access through said telecommunications test system to said test unit of said telephone office.

3. A method according to claim 2, wherein step (b) comprises causing said visual display to display a request for at least one of an identification of said test unit, said subscriber line number, and a user access code.

4. A method according to claim 3, wherein step (b) comprises, in response to the failure of said user to input correct requested information within a prescribed period of time subsequent to the displaying of said request, terminating access through said test system to said test unit of said telephone office.

5. A method according to claim 1, wherein step (a) comprises causing information input by said user to be converted into tone signal format and transmitted to said test system for decoding thereby.

6. A method according to claim 1, wherein step (b) comprises causing a menu of various tests that may be conducted upon said subscriber line by said test unit to be displayed via said visual display in response to information a request for which has been displayed having been input to said test system via said input/output device.

7. A method according to claim 6, wherein step (b) comprises causing said menu of various tests that may be conducted upon said subscriber line by said test unit to be displayed simultaneously via said visual display, while said audio messages associated with different test functions that may be performed by said test unit are being sequentially generated by said test unit and transmitted therefrom to said test system.

8. A method according to claim 1, wherein said telecommunications test system includes a portable, digital processor-controlled unit at which said visual display is provided and wherein said portable, digital processor-controlled unit is operative to conduct wireless communications with said telephone office.

9. A method according to claim 1, wherein said telecommunications test system is operative, in response to information contained in a service request associated with a subscriber line to be tested, to cause said visual display to automatically display the access number of said test unit and said subscriber line number.

10. A method according to claim 1, wherein said test unit comprises a direct access test unit.

11. A system for testing a subscriber line of a telephone network by means of a test unit of a telephone office, said test unit being operative to respond to commands from a telephone test set and to supply a sequence of audio messages to said telephone test set for providing a user with audio information for enabling said user to controlling the operation of said test unit and thereby test said subscriber line, comprising a portable digital processor-based telecommunications test device through which a user, who may be dispatched to a service site that is remotely located with respect to said telephone office serving said subscriber line, may communicate with said test unit of said telephone office and with a test head that is connectable to said subscriber line, said test device having an input/output device, including a visual display, through which information input by said user is converted into prescribed signals and transmitted to said test unit and through which information associated with the operation of said test unit is presented by said test device to said user, and wherein said digital processor-based telecommunications test device is operative to cause said visual display to effect a simultaneous display of information contained in said sequence of audio messages supplied by said test unit to said portable digital processor-based test device, through which a user may cause said test system to conduct a test of said subscriber line, coincidentally with the supplying of said sequence of audio messages to said portable digital processor-based test device by said test unit and to update said displayed information in response to one or more inputs interactively supplied via said input/output device by said user.

12. A system according to claim 11, wherein said digital processor-based telecommunications test device is operative to cause said visual display to display a request for information through which a user may cause said test system to conduct a test of said subscriber line, and in response to a lack of said information being input to said test system within a prescribed period of time, to terminate access to said test unit of said telephone office.

13. A system according to claim 12, wherein said digital processor-based telecommunications test device is operative to cause said visual display to display a request for at least one of an identification of said test unit, said subscriber line number, and a user access code.

14. A system according to claim 13, wherein said digital processor-based telecommunications test device is operative, in response to the failure of said user to input correct requested information within a prescribed period of time subsequent to the displaying of said request, to terminating access to said test unit of said telephone office.

15. A system according to claim 11, wherein said digital processor-based telecommunications test device is operative to cause information input by said user to be converted into tone signal format and transmitted to said test unit of said telephone office for decoding thereby.

16. A system according to claim 11, wherein said digital processor-based telecommunications test device is operative to cause a menu of various tests that may be conducted upon said subscriber line by said test unit to be displayed via said visual display in response to information a request for which has been displayed having been input to said test system via said input/output device.

17. A system according to claim 16, wherein said digital processor-based telecommunication test device is operative to cause said menu of various tests that may be conducted upon said subscriber line by said test unit to be displayed simultaneously via said visual display, while said audio messages associated with different test functions that may be performed by said test unit are being sequentially generated by said test unit and transmitted therefrom to said test unit of said telephone office.

18. A system according to claim 11, wherein said portable digital processor-based telecommunications test device is operative to conduct wireless communications with said telephone office.

19. A system according to claim 11, wherein said portable digital processor-based telecommunications test device is operative, in response to information contained in a service request associated with a subscriber line to be tested, to cause said visual display to automatically display the access number of said test unit and said subscriber line number.

20. A system according to claim 11, wherein said test unit of said telephone office comprises a direct access test unit.

21. A portable, digital processor-based system for enabling a user to test a subscriber line of a telephone network by accessing a direct test unit (DATU) of a telephone office, said DATU being configured to respond to commands from a telephone test set and to supply a sequence of audio messages so as to enable a user to control the operation of the test unit and thereby test a subscriber line, said portable system having an input/output device, including a visual display, with information input by the user being converted into tone signals and transmitted to said DATU, and wherein information contained in said sequence of audio messages supplied by said DATU to said portable, digital processor-based system, and associated with the operation of the DATU, is simultaneously presented by said visual display to the user, coincidentally with the supplying of said sequence of audio messages by said DATU to said portable, digital processor-based system, said displayed information being interactively updated in response to one or more inputs via said input/output device by said use.

22. A system according to claim 21, wherein said digital processor-based telecommunications test system is operative to cause a menu of various tests that may be conducted upon said subscriber line by said test unit to be displayed via said visual display in response to information a request for which has been displayed having been input to said test system via said input/output device.

23. A system according to claim 22, wherein said digital processor-based telecommunication test system is operative to cause said menu of various tests that may be conducted upon said subscriber line by said test unit to be displayed simultaneously via said visual display, while said audio messages associated with different test functions that may be performed by said test unit are being sequentially generated by said test unit and transmitted therefrom to said test unit of said telephone office.

24. A system according to claim 21, wherein said portable digital processor-based telecommunications test system is operative to conduct wireless communications with said telephone office.

25. A system according to claim 21, wherein said portable digital processor-based telecommunications test system is operative, in response to information contained in a service request associated with a subscriber line to be tested, to cause said visual display to automatically display the access number of said test unit and said subscriber line number.

* * * * *